US010891124B2

(12) United States Patent
Oruganti et al.

(10) Patent No.: US 10,891,124 B2
(45) Date of Patent: Jan. 12, 2021

(54) DEPLOYMENT OF PATCHES IN SOFTWARE APPLICATIONS

(71) Applicant: Oracle International Corporation, Redwood Shores, CA (US)

(72) Inventors: Satish Oruganti, Bangalore (IN); Shreyas Ravindranath, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/260,090

(22) Filed: Jan. 28, 2019

(65) Prior Publication Data

US 2020/0241862 A1 Jul. 30, 2020

(51) Int. Cl.

| | |
|---|---|
| ***G06F 9/44*** | (2018.01) |
| ***G06F 8/65*** | (2018.01) |
| ***G06F 11/30*** | (2006.01) |
| ***G06F 11/34*** | (2006.01) |

(52) U.S. Cl.

CPC ............ *G06F 8/65* (2013.01); *G06F 11/3086* (2013.01); *G06F 11/3476* (2013.01)

(58) Field of Classification Search

None

See application file for complete search history.

(56) References Cited

U.S. PATENT DOCUMENTS

| | | | | |
|---|---|---|---|---|
| 6,357,040 | B1 * | 3/2002 | Porter | G06F 9/44505 717/154 |
| 2004/0015949 | A1 * | 1/2004 | Taylor | G06F 8/71 717/171 |
| 2017/0222910 | A1 * | 8/2017 | Cai | H04L 43/16 |

OTHER PUBLICATIONS

Puneet Aggarwal , Patch Advisor Tool for Oracle Applicateons, Doctoral Theses (Maths), http://shodhbhagirathi.iitr.ac.in:8081/jspui/handle/123456789/10273, date 2002, pp. 1-1.

* cited by examiner

*Primary Examiner* — Qamrun Nahar
(74) *Attorney, Agent, or Firm* — IPHORIZONS PLLC; Narendra Reddy Thappeta

(57) ABSTRACT

An aspect of the present disclosure facilitates deployment of patches in computing systems. In an embodiment, specific objects of a software application that have been used for processing of commands are identified. A set of objects of the specific objects having patches available to be applied are then determined. The available patches may be retrieved and applied. As a result, patches may not be applied to objects that are not used. According to another aspect, usage data indicating usage of each object when the object is invoked for processing of corresponding command, is maintained. An administrator is also provided the ability to configure a set of rules indicating conditions under which existence of patches is to be checked for used objects, and the usage data is examined according to the set of rules.

20 Claims, 8 Drawing Sheets

400

| | 421 | 422 | 423 | 424 | 425 | 426 |
|---|---|---|---|---|---|---|
| | ERP Object ID | Object Description | From Date | To Date | Object Type | Total Count (usage) |
| 441 | P91CB080 | Contact Opportunity | 01/01/18 | 121/15/18 | APPL | 27,458 |
| 442 | P91CB080 | Contact Opportunity | 03/01/18 | 03/31/18 | APPL | 27,449 |
| 443 | P91DH611 | Case Activities | 01/01/18 | 12/15/18 | APPL | 21,432 |
| 444 | P91DH611 | Case Activities | 03/01/18 | 03/31/18 | APPL | 21,432 |
| 445 | P91DG602 | CRM Case Solutions | 01/01/18 | 12/15/18 | APPL | 15,341 |
| 446 | P91DG602 | CRM Case Solutions | 03/01/18 | 03/31/18 | APPL | 15,341 |
| 447 | P91DG602 | CRM Case Solutions | 03/15/18 | 03/15/18 | APPL | 15,341 |

```
9640/9620   Wed Oct   3 05:19:14.783012     jdeshortcut.c161
      WARNING: As of 8.93, the location of the JAS server should be defined using OCM.

9640/9620   Wed Oct   3 05:19:14.785000     jdeshortcut.c162
      INFORMATION: Resolving the JAS server location using backward compatibility settings.

9640/9620   Wed Oct   3 05:19:15.637000     jdeshortcut.c161
      WARNING: As of 8.93, the location of the JAS server should be defined using OCM.

9640/9620   Wed Oct   3 05:19:15.638001     jdeshortcut.c162
      INFORMATION: Resolving the JAS server location using backward compatibility settings.

9640/9620   Wed Oct   3 05:19:17.251013     jdemsg.c833
      sendMessageRecipientV2:  ERROR:  OVERLAPPING OCCUPANCY FOR UNIT INVALID

9640/9620   Wed Oct   3 05:19:17.252001     jdemsg.c343
        Recipient < recipient>:
        Recipient Type: <4>
        Address Book Number: <0>
        Number: <0>
        Structure Type: < >
        SMTP: <<null>>
```

511 (boxed rows P91BC010 / P1501)

| | | | |
|---|---|---|---|
| R15401 | Lease Master Listing | | |
| R15403 | Lease Expiration Listing | | |
| 27979829 | ROUA EXPENSE – EXCLUDE PERIOD 0 | 15 | 05.29.2018 |
| B1501370 | Create Amortization Schedules | | |
| P91BC010 | LEASE MASTER (P1501) GIVES ERROR OVERLAPPING OCCUPANCY FOR UNIT INVALID (1058) | 15 | 07.03.2018 |
| P1501 | Lease Master Maintenance | | |
| 28095103 | ERROR REC'D IN UNIT MASTER – TOTAL SF EXCEEDS FLOOR SF (2457) | 15 | 06.19.2018 |
| P15217 | Unit Search | | |
| 28243397 | P1501 DOSE NOT ALLOW ACCESS TO LOG DETAILS WHEN LEASE RECORD IS RESERVED | 15 | 08.21.2018 |
| P1501 | Lease Master Maintenance | | |
| 28262400 | CHANGING BILL CODE IN P1512 DOSE NOT AUTO CHANGE REMARK FIELD | 15 | 07.24.2018 |
| P1502 | Recurring Billing Revisions | | |

*FIG. 5A*

- OBJECT LIST

| | | | | |
|---|---|---|---|---|
| B1500050 | Create New Lease Version | 15 | 10.01.2018 | 15:59:18 |
| B1500125 | Get F1517 Record Count | 15 | 10.01.2018 | 15:59:22 |
| B1501230 | Retrieve Straight-line Generation Processing Options-P1501 | 15 | 10.01.2018 | 15:59:24 |
| B1501340 | Validate Recurring Billing for Lessee Accounting | 15 | 10.01.2018 | 15:59:27 |
| B1501350 | Recurring Billing Lease Liability Validation Cache | 15 | 10.01.2018 | 15:59:30 |
| B1501370 | Create Amortization Schedules | 15 | 10.01.2018 | 15:59:34 |
| B1501380 | Create Journal Entries for Lease Commencement | 15 | 10.01.2018 | 15:59:36 |

| | Object ID (611) | Description (612) | Patch Recommended (613) | |
|---|---|---|---|---|
| 631 → | P91CB080 | High Usage | JN11345 | Apply |
| 632 → | P91DH611 | High Usage | JN12464 | Apply |
| 633 → | P91BC010 | Error | JN11211 | Apply |

*FIG. 6*

DEPLOYMENT OF PATCHES IN SOFTWARE APPLICATIONS

BACKGROUND OF THE DISCLOSURE

Technical Field

The present disclosure relates to software applications, and more specifically to deployment of patches in software applications.

Related Art

Software applications are employed for various functions or utilities as is well known in the relevant art. A software application is generally embodied in the form of software code (hereafter "application code") and instances of the software application are realized by execution of such application code.

Patches are often applied to software applications for obtaining results such as fixing known problems, performance enhancements, addressing security vulnerabilities, etc. A patch also contains software code, which replaces corresponding portions of the application code, and/or adds to the application code, for obtaining such results.

Vendors of software applications often make such patches available (for example, on the world-wide-web) such that the owners/users of the corresponding applications can download and apply the patches. The owners/users in such scenarios are said to deploy the patches in corresponding software applications.

Aspects of the present disclosure relate to deployment of patches in software applications.

BRIEF DESCRIPTION OF THE DRAWINGS

Example embodiments of the present disclosure will be described with reference to the accompanying drawings briefly described below.

FIG. 4A depicts an example of object usage data related to execution of modules, maintained in one embodiment.

FIG. 4B depicts a log file which can be examined to identify errors in object usage in an embodiment.

FIGS. 5A and 5B depict information maintained about patches in an embodiment.

FIG. 6 depicts details of a notification in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. OVERVIEW

An aspect of the present disclosure facilitates deployment of patches in computing systems. In an embodiment, specific objects of a software application that have been used for processing of commands are identified. A set of objects of the specific objects having patches available to be applied are then determined. The available patches may be retrieved and applied.

As a result, patches may not be applied to objects that are not used.

According to another aspect, usage data indicating usage of each object when the object is invoked for processing of corresponding command, is maintained. An administrator is also provided the ability to configure a set of rules indicating conditions under which existence of patches is to be checked for used objects, and the usage data is examined according to the set of rules.

In an embodiment, the usage data includes a respective counter associated with each of the specific objects identified to have been used, the counter specifying a number of times the object has been used. A first rule specifies a threshold value, wherein each of the specific objects is included in the set of objects if the associated counter has a number greater than the threshold value.

According to another aspect, the usage data contains an error log generated in processing of an associated command, wherein the set of rules includes a second rule specifying that patches are to be checked for addressing an error. In an embodiment, any patches available for addressing the error are identified by communicating with the patch portal.

According to one more aspect, the usage data is formed in a web server which receives the commands and forms responses to the commands by interfacing with applications deployed in the computing systems.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. EXAMPLE ENVIRONMENT

Figure 1:
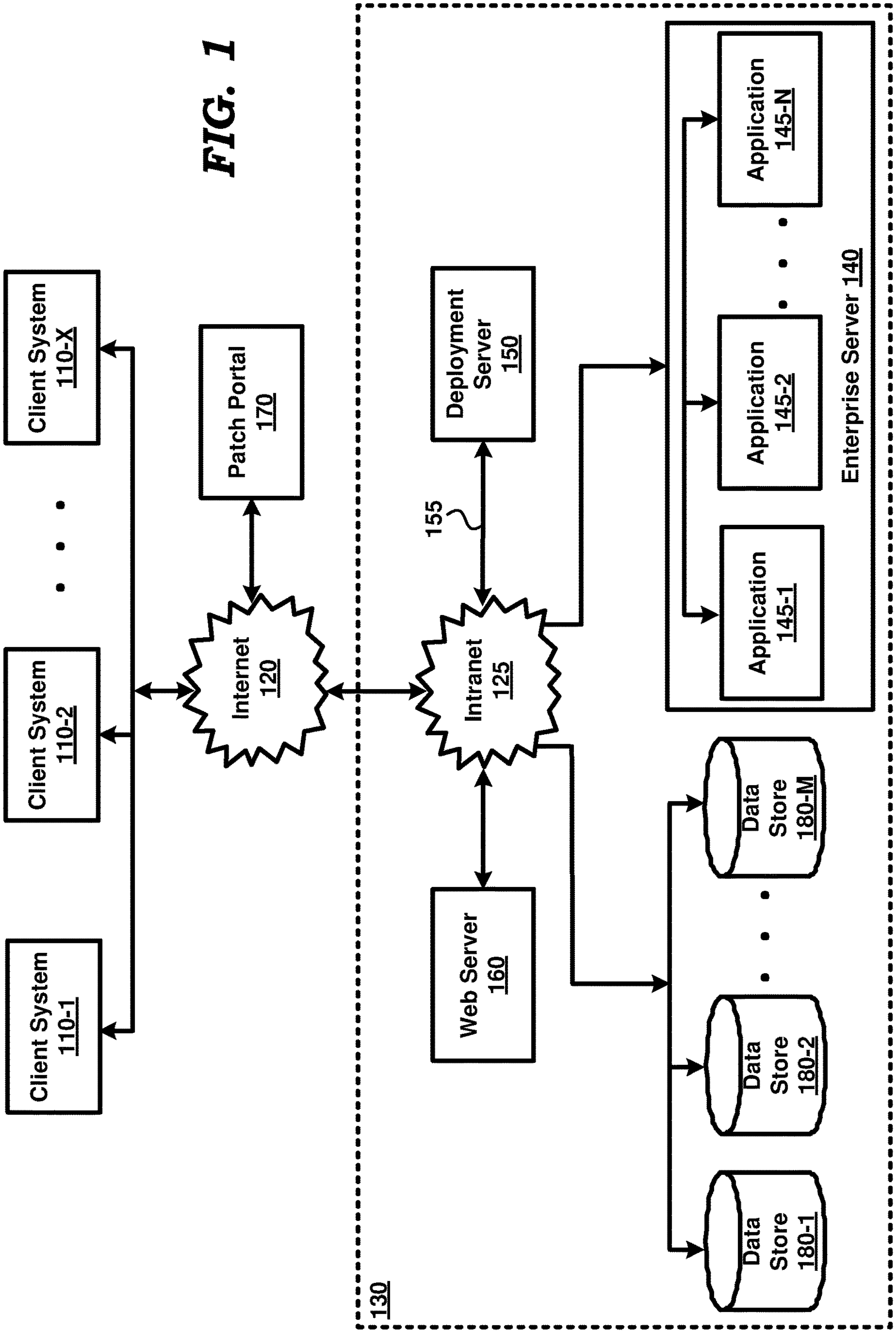
FIG. 1 is a block diagram illustrating the details of an example computing system in which several aspects of the present disclosure can be implemented.

FIG. 1 is a block diagram illustrating an example computing system in which several aspects of the present disclosure can be implemented. The block diagram is shown containing client systems 110-1 to 110-X, internet 120, patch portal 170 and enterprise computing environment 130. Enterprise computing environment 130 in turn is shown containing web server 160, intranet 125, enterprise server 140 (in turn containing applications 145-1 to 145-N), data stores 180-1 to 180-M and deployment server 150.

Client systems 110-1 to 110-X are collectively or individually referred by referral numeral 110, as will be clear from the context. Similar convention is adapted with respect to data stores 180-1 through 180-M, and applications 145-1 through 145-N also, wherein X, M, and N represent any arbitrary positive numbers as suitable in the corresponding environments.

Merely for illustration, only representative number/type of blocks is shown in FIG. 1. Many environments often contain many more blocks, both in number and type, depending on the purpose for which the environment is designed. For example, a typical enterprise contains many enterprise servers served potentially by multiple deployment servers. Each block of FIG. 1 is described below in further detail.

Each of client systems 110-1 to 110-X represents a system such as a personal computer, workstation, mobile device, computing tablet etc., used by end users to generate (user) commands directed to the various blocks of enterprise computing system 130. The commands may be generated using appropriate user interfaces (e.g., web pages provided by an application executing in the server, a native user interface provided by a portion of an application downloaded from the server, etc.). In general, a client system 110 sends a command and may receive the corresponding responses (e.g., embedded in web pages) containing the results of execution of the commands. The web pages/responses may then be presented to the user at client systems 110-1 to 110-X by client applications such as the browser.

Internet 120 represents a data network providing connectivity between client systems 110-1 to 110-X, patch portal 170 and blocks of enterprise computing system 130. Internet 120 may encompass the world-wide connected Internet. Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is the to be directed to a target system when the destination IP address of the packet is set to the IP address of the target system, such that the packet is eventually delivered to the target system by internet 120. When the packet contains content such as port numbers, which specifies a target application, the packet may be directed to such application as well.

Intranet 125 provides connectivity between various systems/servers of enterprise computing system 130, while also extending the connectivity to various other devices accessible via internet 120. Intranet 125 may be implemented as local area networks (e.g., using wireless and wire-based technologies) supporting TCP/IP protocols.

Web server 160 provides interfaces for client systems 110 to send commands and receive corresponding responses. Web server 160 interfaces with application instances 145-1 through 145-N for generating the content of the responses. In an embodiment, the commands are received in the form of HTTP requests and the responses are generated in the form of web pages served to the specific one of client systems 110 from which the command is received. Web server 160 may be implemented using products such as Apache web server, IIS web server, etc.

Each data store 180 represents a server with non-volatile (persistent) storage and software application facilitating storage and retrieval of data by application instances executing in enterprise server 140. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of (log) files organized as one or more directories, as is well known in the relevant arts.

Enterprise server 140 represents a server for executing one or more applications 145-1 to 145-N. Some of the application instances may correspond to the same software application for purposes such as scale and security. However, many application codes corresponding to software applications may be executed in enterprise server 140 as corresponding instances.

Each software application is provided in the form of many smaller (unlinked) modules, which can be replaced individually for patching purpose. All such smaller modules may be linked to generate the application code as an executable module. Thus, such application code is executed to realize a corresponding instance of the software application. It may be appreciated that application of patches entails replacing the software code corresponding to the existing (smaller) modules with the software code provided in the form of patches, with each patch potentially containing software code corresponding to modules in multiple objects. The modules (after application of patches) forms an instance of the patched software application.

According to an aspect of the present disclosure, each such smaller module which can be replaced individually is termed as an object. As may be readily appreciated, the software applications operating as a part of web server 160 and data store 180 may individually be constituted of a corresponding set of smaller modules. All such modules which can be replaced independently are termed as objects. The modules also include database tables/schemas, etc., which can also be individually replaced. For brevity, the description below is provided primarily with respect to patching of the objects in applications in enterprise server 140. However, the features can be implemented in relation to other software applications in enterprise computing system 130.

Patch portal 170 represents a central patch repository, from which (authorized) users can access, download and deploy desired patches. Accordingly, the patches corresponding to various software applications can be provided on patch portal 170. The patches may contain objects which are to replace the corresponding objects of the previously deployed software applications. Patch portal 170 can be accessed at a pre-specified URL. In an embodiment, patch portal 170 corresponds to Oracle Update Center portal provided by Oracle Corporation.

Deployment server 150 aids administrators in management of patches to various software applications. Deployment server 150 downloads patches from patch portal 170 and applies the downloaded patches to various objects contained in software applications 145, with a desired level of control to the administrators. Aspects of the present disclosure relate to deployment of patches in software applications, as described in further detail below.

3. DEPLOYMENT OF PATCHES IN SOFTWARE APPLICATIONS

Figure 2:
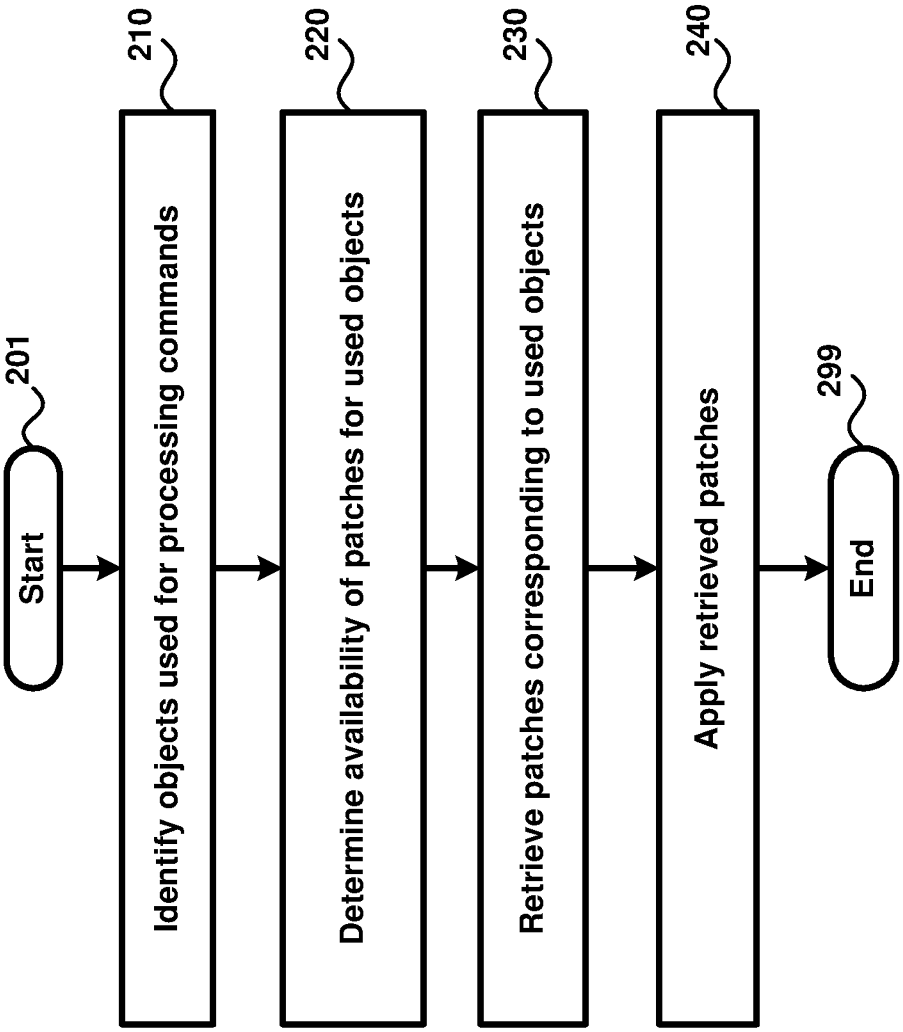
FIG. 2 is a flow-chart illustrating the manner in which patches are deployed in an embodiment of the present disclosure.

FIG. 2 is a flow chart illustrating deployment of patches in software applications according to an aspect of the present disclosure. The flowchart is described with respect to FIG. 1 merely for illustration. However, many of the features can be implemented in other environments and for other applications also without departing from the scope and spirit of several aspects of the present invention, as will be apparent to one skilled in the relevant arts by reading the disclosure provided herein. Also, some of the steps may be performed in a different sequence than that depicted below, as suited to the specific environment, as will be apparent to one skilled in the relevant arts by reading the disclosure provided herein. Many of such implementations are contemplated to be covered by several aspects of the present invention. The flow chart begins in step 201, in which control immediately passes to step 210.

In step 210, the objects used in processing of commands received from various client systems 110 are identified. The identification depends on the technology employed in corresponding environments. In an embodiment, an orchestrator component provided in web server 160 invokes the individual objects in various applications within enterprise computing system 130 and receives the corresponding intermediate responses as well, in the process of formulating a response for each command Accordingly, the components within web server 160 may identify the specific objects that are invoked in the processing of each command Alternatively, additional logging components may be employed in various one of the servers 140, 160 and 180 to aid the identification of the specific objects invoked. The implementation of such logging components will be apparent to a skilled practitioner by reading the disclosure provided herein. As yet another alternative, the data transmissions on intranet 125 can also be snooped/examined to identify the objects invoked.

In step 220, a determination is made as to whether the used objects have any patches (that are not yet applied). The information in patch portal 170 may be examined for such a determination. In an embodiment, a comparison is made between the creation date or last updated date of the object with the patch availability date to establish if the patch contains the used object. This determines whether the patch from patch portal 170 needs to be applied for a specific user setup or not. The same logic is applied to all objects that are contained in the patch. If any one or more objects in the patch satisfies this criterion, the patch is queued to be applied. In an alternative embodiment, a version number is maintained associated with each object, with the presence of an object with a later version number indicating the presence of a patch for the corresponding object.

Patches corresponding to the used objects are retrieved from patch portal 170 in step 230 and applied in step 240. As noted above, applying a patch entails replacing a currently in use module with the replacement module provided as a patch. The patches may be retrieved and applied in one of several known ways. The flowchart ends in step 299.

Thus, the flowchart of FIG. 2 ensures that the latest patches are applied to objects that are actually of use in enterprise computing system 130. Accordingly, patching may be avoided for objects not in use, while ensuring the benefit of latest patches soon to the objects actually used.

The features noted above can be implemented in various embodiments. The description is continued with respect to the details of an example embodiment.

4. EXAMPLE IMPLEMENTATION

Figure 3:
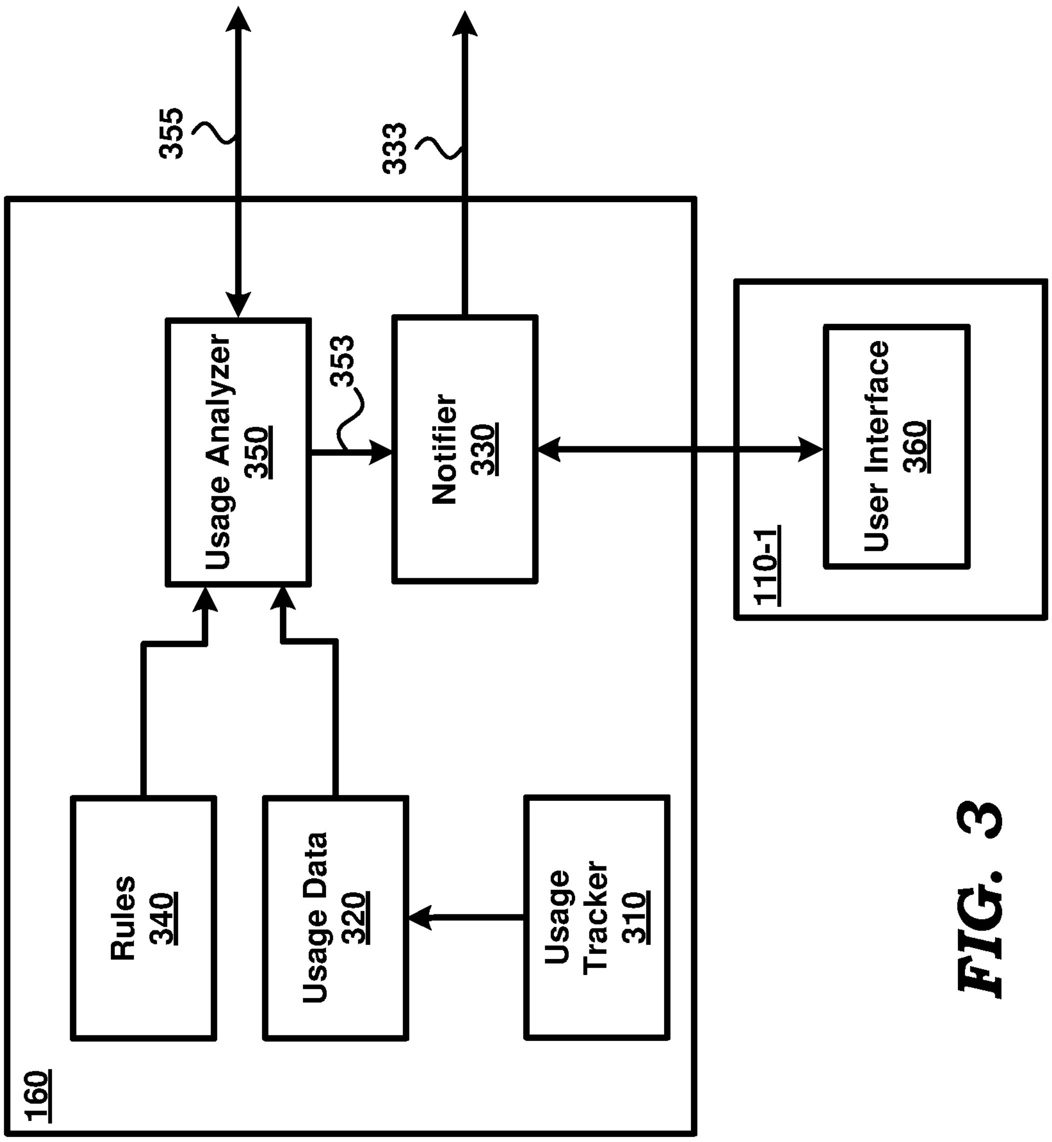
FIG. 3 is a block diagram depicting the various components aiding deployment of patches in an embodiment.

FIG. 3 is a sample block diagram depicting the various components aiding deployment of patches in an embodiment. The block diagram is shown containing usage tracker 310, usage data 320, notifier 330, rules 340, usage analyzer 350 and user interface 360. The blocks are shown in specific systems merely for illustration. However, the blocks can be deployed in other systems also, as will be apparent to a skilled practitioner by reading the disclosure herein.

Usage tracker 310 identifies objects used for processing requests. In an embodiment, usage tracker 310 orchestrates the invocation of execution of various software modules (objects) in all of servers 140, 160 and 180 via deployment server 150 and accordingly has a view of the specific modules that are invoked for execution. Usage tracker 310 may provide the invocation information in a format suitable for processing by usage analyzer 350.

Usage tracker 310 may also receive error codes representing any error conditions that have occurred during execution of the invoked software modules. The error codes also thus indicate usage of modules causing the error conditions. Usage tracker 310 logs the usage information (of invoked modules and error codes) in usage data 320.

Usage data 320 represents information indicating the usage of various objects. Any convention may be employed for such representation, while some example conventions with respect to invocations and errors are described in sections below. Usage data 320 may be represented in a manner convenient for examination in accordance with rules 340. In one embodiment, usage data 320 related to invocations may be in the form of raw data indicating the invocation of each module along with the invocation time stamp. However, in an alternative embodiment described below, usage data 320 contains counts for various periods of interest as described with examples in sections below.

Rules 340 specify the conditions in which objects logged as being used in usage data 320 are to be considered for patching. The rules may be customized by the administrator as per the requirements in the corresponding environment. In an embodiment, the rules are based on invocation counts of objects as well as error conditions. In embodiments where usage data 320 contains invocation counts per period of interest, the corresponding rules are based on such counts. For example, a rule may specify that patches are to be checked for objects having invocation count for a specific duration (e.g., month or day or year) exceeding a specific threshold. Another rule may specify that patches are to be checked if the invocation counts indicate that the object is likely to be used in a future duration.

Usage analyzer 350 examines usage data 320 in accordance with rules 340 to identify the specific objects which are to be considered for patching. With respect to objects provided with invocation counts, those objects satisfying any of the usage rules of rules 340 may be first identified and usage analyzer 350 thereafter checks (with patch portal 170 on path 355) whether patches exist for such objects. If a patch is found to exist for an object, usage analyzer 350 provides the patch identifier to notifier 330 on path 353. The existence of patches for objects of interest may be determined according to any pre-specified convention, as will be apparent to a skilled practitioner. Usage information corresponding to the object(s) causing the patch to be identified, may also be provided to notifier 330.

Notifier 330 notifies an administrator via user interface 360 of the existence of patches of interest (along with usage or error information, as applicable) received from usage analyzer 350. Notifier 330 thereafter receives from user interface 360 a list of patches that are selected by an administrator for deployment. It may be appreciated that not all of such selected patches can be deployed due to conflicts and accordingly notifier 330 communicates the selected list of patches over path 333 to deployment server 150. Deployment server 150 may accordingly interface with patch portal 170 to download the patches selected by the administrator, examines the downloaded patches to determine the set of patches that can be deployed without any conflicts, and thereafter applies the non-conflicting set of patches to the corresponding application code.

User interface 360 receives notifications of existence of patches of interest and enables an administrator to select a list of patches that are to be investigated for deployment as described in the preceding paragraph. User interface 360 needs to be implemented consistent with the notification approach employed by notifier 330. For example, in an embodiment, the notification is in the form of an email with a URL that can be clicked by the administrator to view the patches of interest. The administrator may accordingly select patches of interest in user interface 360, and the selected list is provided back to notifier 330.

Accordingly, aspects of the present disclosure provide for suitably identifying the patches that may need to be deployed, and causes the patches to be deployed with seamless interface for the administrators.

The description is continued with respect to the details of usage data 320 in an embodiment.

5. EXAMPLE OF USAGE DATA

FIG. 4A depicts an example format of usage data 320, as related to invocation of objects, in one embodiment. With respect to executable modules, invocation implies execution of the corresponding modules. On the other hand, for objects such as tables, invocation may imply access (read, write, delete, etc.) of the data in the corresponding tables. While usage data 320 is shown maintained in a table format, it should be appreciated that other data structures such as XML may be instead employed, as will be apparent to one skilled in the relevant arts by reading the disclosure herein.

Table 400 is shown containing columns 421-426 and rows 441-447, with each row being maintained for a corresponding object. Column 421 specifies the object ID of the object of the corresponding row, column 422 specifies the corresponding description of the object, column 426 specifies total usage count of the object, the dates of columns 423-424 specifying the applicable duration in which the count is applicable, and column 425 specifies the object type (with APPL indicating that the corresponding objects are of executable modules of applications type).

Rows 441 and 442 refer to the application object P91CB080 for two different collection durations. Row 441 indicates that the usage of object for (almost) a year is 27,458 whereas row 442 indicates that the usage of the same object for a specific month in the same year (which is March in this case), is 27,449. It may be appreciated that the difference is not significant in both the cases (the difference being only 9), which clearly indicates that usage of the specific object is maximum during the particular month March and it is rarely being used much during the rest of the months in the year other than in March.

Rows 443 and 444 indicate a similar example with a different application object with object ID P91DH611. The total count for rows 443 and 444 is indicated to be the same and it is 21,432 in both the cases. This again depicts that the object is being used only in the month of March and not being used at all during the rest of the 11 months in the year.

Rows 445, 446 and 447 respectively refer to the same object with object ID namely P91DG602, for a duration of a year, a specific month in the same year and a particular day in the specific month March that is being referred in row 446. A close examination of the data indicates that the usage for rows 445, 446 and 447 is 15,341, which means that the usage of the object is occurring only on a specific day of the March (Mar. 15, 2018) and the object is not actually being used even once during the rest of the days in the year.

While FIG. 4A depicts the usage data as relevant to execution of modules, FIG. 4B depicts relevant portions of log file 450 which contains error conditions constituting usage data 320. Specifically log file 450 is shown containing error message 451 with a date stamp (of occurrence of the error) and a description of "ERROR: OVERLAPPING OCCUPANCY FOR UNIT INVALID". The error indicates execution of some modules, which cause the error message to be logged. Usage data 320 thus formed can be used for deployment of patches as described below in further detail.

6. EXAMPLE DEPLOYMENT

As noted above, usage analyzer 350 examines usage data 320 according to rules 340. Specifically, usage analyzer 350 examines usage data table 400 in accordance with any rules related to invocation of executable modules.

For example, one of the rules may specify that patches are to be checked for objects having invocation count for any month and exceeding a threshold of 20,000 counts. Out of the available data of FIG. 4A, two rows 442 and 444 are identified meeting the specified criteria having the values of 27,449 and 21,432 respectively. The value of 15,341 in row 446 does not meet the criteria (exceeding 20,000 counts) specified in the rule. The respective objects with IDs P91CB080 and P91DH611 are accordingly considered objects of interest.

Usage analyzer 350 accordingly checks whether there exists a respective patch for each of such objects of interest by interfacing with patch portal 170. Any patches thus uncovered are added to a pre-conflict list. Usage analyzer 350 determines patches corresponding to error conditions also as described below.

Usage analyzer 350 examines rules 340 to identify any applicable rules related to error conditions. It is assumed that a second rule requires consideration of patches that would fix any specific error that has occurred at least a threshold number of times in a specified duration (e.g., past month). Usage analyzer 350 accordingly examines log file 450 to identify any errors that match such criteria specified in rules 340. For illustration, it is assumed that error message 451 matches the criteria and is accordingly an error of interest.

Usage analyzer 350 accordingly interfaces with patch portal 170 to identify any patches that are designed to fix the identified errors of interest. In an embodiment, patch portal 170 provides a facility by which error description can be used to search patches that address the corresponding error. Accordingly, usage analyzer 350 may automatically (without requiring user inputs for the initiation and performance of the search) search patch portal 170 based on the error description, to identify the corresponding patch.

Usage analyzer 350 may seek any additional information available on the patch from patch portal 170. FIGS. 5A and 5B together depict such additional information related to the patch. Specifically, FIG. 5A depicts text noting the various issues (including errors) addressed by the patch, with entry 511 showing the specific error of interest as also being addressed by the patch. FIG. 5B depicts the list of all objects updated by the patch.

While the above noted embodiment operates to identify the relevant patch first and the objects therein thereafter, it may thus be appreciated that the interfaces between usage analyzer 350 and patch portal 170 may be suitably modified such that the object causing the error is identified first and the patch recommended is identified therefrom.

From the above, it may be appreciated that usage analyzer 350 determines the objects that have been used and the recommended patches for those objects. Accordingly, usage analyzer 350 constructs a list of recommended patches along with object identifiers, and provides the pertinent information to notifier 330. The corresponding list is depicted in FIG. 6, with two rows 631 and 632 corresponding to patches being recommended due to high usage, and row 633 corresponding to a patch recommended due to an error condition.

Notifier 330 sends the recommended patch list to an administrator and using user interface 360 the administrator may exclude some of the recommended patches, while the rest of the recommended patches being considered as selected patches. Notifier 330 receives such selected patches and forwards the selected list to deployment server 150.

Deployment server 150 provides the (identifiers of) selected list of patches to patch portal 170, which sequences the deployment sequence to attempt to avoid any conflicts. If conflicts cannot be resolved, patch portal 170 indicates the patches causing the unresolved conflicts. Deployment server 150 may provide a suitable user interface to enable to the administrator to choose to go forward with the deployment of patches without conflicts.

Accordingly, deployment server 150 downloads such patches from patch portal 170 and applies the patches to the application code.

It should be appreciated that the features described above can be implemented in various embodiments as a desired combination of one or more of hardware, software, and firmware. The description is continued with respect to an embodiment in which various features are operative when the software instructions described above are executed.

7. DIGITAL PROCESSING SYSTEM

Figure 7:
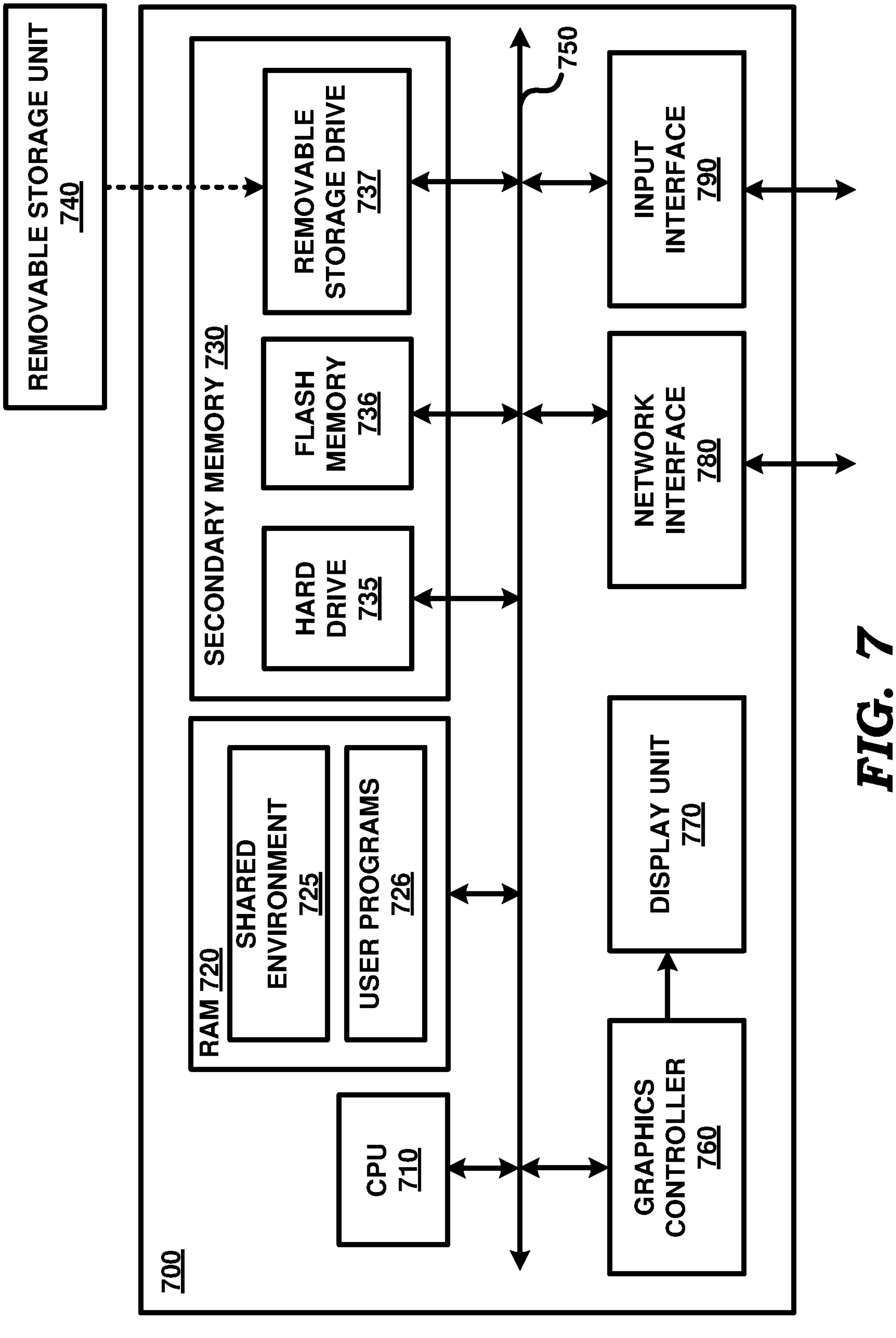
FIG. 7 is a block diagram illustrating the details of a digital processing system in which several aspects of the present disclosure are operative by execution of appropriate executable module.

FIG. 7 is a block diagram illustrating the details of digital processing system 700 in which various aspects of the present disclosure are operative by execution of appropriate executable modules. Digital processing system 700 may correspond to systems implementing the blocks depicted above in FIG. 3.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 (e.g., the web server functionality in case the blocks of FIG. 3 are implemented in web server 160, as shown there) and/or other user programs 726 (including those implementing the blocks of FIG. 3). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems (of FIG. 1) connected to the network (110).

Secondary memory 730 may contain hard drive 735, flash memory 736, and removable storage drive 737. Secondary memory 730 may store the data and software instructions (for example, for implementing the various features of the present disclosure described above), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases “in one embodiment”, “in an embodiment” and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. CONCLUSION

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of facilitating deployment of patches in computing systems, the method comprising:

identifying specific objects of a plurality of objects of a software application that have been used for processing of commands by examining a usage data indicating usage of each object, wherein said specific objects comprises a first object and said plurality of objects comprises a second object that is not comprised in said specific objects;

checking whether there exists a corresponding patch for each of said specific objects, but not for said second object, wherein objects of said specific objects having said corresponding patch comprises a set of objects;

retrieving patches available for the set of objects; and applying the patches to the software application.

2. The method of claim 1, further comprising storing said usage data indicating usage of each object when the object is invoked for processing of corresponding command, wherein the specific objects contain the objects, wherein said checking comprises communicating with a patch portal to determine the set of objects.

3. The method of claim 2, further comprising:

analyzing the usage data according to a set of rules for the determining, wherein the rules are configurable by an administrator.

4. The method of claim 3, wherein the usage data includes a respective counter associated with each of the specific objects identified to have been used, the counter specifying a number of times the object has been used, wherein the set of rules includes a first rule specifying a threshold value, wherein each of the specific objects is included in the set of objects if the associated counter has a number greater than the threshold value.

5. The method of claim 4, wherein the usage data contains an error log generated in processing of an associated command, wherein the set of rules includes a second rule specifying that patches are to be checked for addressing an error, wherein the identifying and the determining comprises communicating with the patch portal to identify any patches available for addressing the error.

6. The method of claim 2, further comprising proactively notifying availability of patches for the set of objects that have been used for processing of commands.

7. The method of claim 2, wherein the identifying is performed in a web server which receives the commands and forms responses to the commands by interfacing with applications deployed in the computing systems, wherein the web server comprises an orchestrator to invoke objects of the applications in processing of the commands, wherein the identifying is performed along with the invocation of the objects, wherein applying a patch to each object entails replacing the object with the patch which is obtained from a central repository.

8. A non-transitory machine-readable medium storing one or more sequences of instructions, wherein execution of said one or more instructions by one or more processors contained in a digital processing system causes the digital processing system to perform the actions of:

identifying specific objects of a plurality of objects of a software application that have been used for processing of commandsby examining a usage data indicating usage of each object, wherein said specific objects comprises a first object and said plurality of objects comprises a second object that is not comprised in said specific objects;

checking whether there exists a corresponding patch for each of said specific objects, but not for said second object, wherein objects of said specific objects having said corresponding patch comprises a set of objects;

retrieving patches available for the set of objects; and applying the patches to the software application.

9. The non-transitory machine-readable medium of claim 8, further comprising one or more instructions for storing said usage data indicating usage of each object when the object is invoked for processing of corresponding command, wherein the specific objects contain the object, wherein said checking comprises communicating with a patch portal to determine the set of objects.

10. The non-transitory machine-readable medium of claim 9, further comprising one or more instructions for:

analyzing the usage data according to a set of rules for the determining, wherein the rules are configurable by an administrator.

11. The non-transitory machine-readable medium of claim 10, wherein the usage data includes a respective counter associated with each of the specific objects identified to have been used, the counter specifying a number of times the object has been used, wherein the set of rules includes a first rule specifying a threshold value, wherein each of the specific objects is included in the set of objects if the associated counter has a number greater than the threshold value.

12. The non-transitory machine-readable medium of claim 11, wherein the usage data contains an error log generated in processing of an associated command, wherein the set of rules includes a second rule specifying that patches are to be checked for addressing an error, wherein the identifying and the determining comprises communicating with the patch portal to identify any patches available for addressing the error.

13. The non-transitory machine-readable medium of claim 9, further comprising one or more instructions for proactively notifying availability of patches for the set of objects that have been used for processing of commands.

14. The non-transitory machine-readable medium of claim 9, wherein the identifying is performed in a web server which receives the commands and forms responses to the commands by interfacing with applications deployed in the computing systems, wherein the web server comprises an orchestrator to invoke objects of the applications in processing of the commands, wherein the identifying is performed along with the invocation of the objects, wherein applying a patch to each object entails replacing the object with the patch which is obtained from a central repository.

15. A digital processing system for facilitating deployment of patches in computing systems, the digital processing system comprising:

a memory to store instructions;

one or more processors to execute the instructions stored in the memory to cause the digital processing system to perform the actions of:

identifying specific objects of a plurality of objects of a software application that have been used for processing of commands by examining a usage data indicating usage of each object, wherein said specific objects comprises a first object and said plurality of objects comprises a second object that is not comprised in said specific objects;

checking whether there exists a corresponding patch for each of said specific objects, but not for said second object, wherein objects of said specific objects having said corresponding patch comprises a set of objects;

determining a set of objects of the specific objects having patches available to be applied;

retrieving patches available for the set of objects; and applying the patches to the software application.

16. The digital processing system of claim 15, further performing the actions of storing said usage data indicating usage of each object when the object is invoked for processing of corresponding command, wherein the specific objects contain the object, wherein said checking comprises communicating with a patch portal to determine the set of objects.

17. The digital processing system of claim 16, further performing the action of:

analyzing the usage data according to a set of rules for the determining, wherein the rules are configurable by an administrator.

18. The digital processing system of claim 17, wherein the usage data includes a respective counter associated with each of the specific objects identified to have been used, the counter specifying a number of times the object has been used, wherein the set of rules includes a first rule specifying a threshold value, wherein each of the specific objects is included in the set of objects if the associated counter has a number greater than the threshold value.

19. The digital processing system of claim 18, wherein the usage data contains an error log generated in processing of an associated command, wherein the set of rules includes a second rule specifying that patches are to be checked for addressing an error, wherein the identifying and the determining comprises communicating with the patch portal to identify any patches available for addressing the error.

20. The digital processing system of claim 16, wherein the identifying is performed in a web server which receives the commands and forms responses to the commands by interfacing with applications deployed in the computing systems, wherein the web server comprises an orchestrator to invoke objects of the applications in processing of the commands, wherein the identifying is performed along with the invocation of the objects, wherein applying a patch to each object entails replacing the object with the patch which is obtained from a central repository.

* * * * *

UNITED STATES PATENT AND TRADEMARK OFFICE
CERTIFICATE OF CORRECTION

PATENT NO. : 10,891,124 B2
APPLICATION NO. : 16/260090
DATED : January 12, 2021
INVENTOR(S) : Oruganti et al.

It is certified that error appears in the above-identified patent and that said Letters Patent is hereby corrected as shown below:

On the Title Page

Column 2, Item (56), under Other Publications, Line 1, delete "Applicateons," and insert -- Applications, --, therefor.

In the Specification

In Column 5, Line 22, delete "command" and insert -- command. --, therefor.

In the Claims

In Column 12, Line 30, in Claim 8, delete "commandsby" and insert -- commands by --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*